US010108308B2

(12) United States Patent
McDougall et al.

(10) Patent No.: US 10,108,308 B2
(45) Date of Patent: Oct. 23, 2018

(54) SENSING USER INPUT TO CHANGE ATTRIBUTES OF RENDERED CONTENT

(71) Applicant: Rakuten Kobo Inc., Toronto (CA)

(72) Inventors: Paul McDougall, Toronto (CA); Arpit Guglani, Toronto (CA); Reilly Watson, Toronto (CA)

(73) Assignee: RAKUTEN KOBO INC., Toronto (CA)

(*) Notice: Subject to any disclaimer, the term of this patent is extended or adjusted under 35 U.S.C. 154(b) by 104 days.

(21) Appl. No.: 14/089,250

(22) Filed: Nov. 25, 2013

(65) Prior Publication Data

US 2015/0149953 A1    May 28, 2015

(51) Int. Cl.
*G06F 3/048* (2013.01)
*G06F 3/0481* (2013.01)
*G06F 3/0483* (2013.01)
*G06F 3/0488* (2013.01)

(52) U.S. Cl.
CPC .......... *G06F 3/0481* (2013.01); *G06F 3/0483* (2013.01); *G06F 3/04883* (2013.01); *G06F 2203/04806* (2013.01); *G06F 2203/04808* (2013.01)

(58) Field of Classification Search
CPC ............... G06F 3/0481; G06F 9/4443; G06F 2203/04806
USPC .................... 715/781, 269, 863, 798
See application file for complete search history.

(56) References Cited

U.S. PATENT DOCUMENTS

| 5,802,533 A * | 9/1998 | Walker ............ 715/201 |
| 8,149,249 B1 * | 4/2012 | Oplinger ............ G09G 5/00 345/661 |
| 2007/0006086 A1 * | 1/2007 | Kokko et al. ............ 715/760 |
| 2010/0007617 A1 * | 1/2010 | Tsai ............ G06F 3/0416 345/173 |
| 2011/0072390 A1 * | 3/2011 | Duga ............ G06F 3/0481 715/800 |
| 2011/0107206 A1 * | 5/2011 | Walsh ............ G06F 17/2785 715/256 |
| 2011/0115796 A1 * | 5/2011 | Murrett ............ G06T 11/60 345/467 |
| 2011/0289462 A1 * | 11/2011 | Harris et al. ............ 715/863 |
| 2011/0298830 A1 * | 12/2011 | Lam ............ 345/661 |
| 2012/0182318 A1 * | 7/2012 | Mansfield ............ G06T 3/0006 345/643 |
| 2012/0240037 A1 * | 9/2012 | Migos et al. ............ 715/255 |

(Continued)

*Primary Examiner* — Ajay M Bhatia
*Assistant Examiner* — Alex Olshannikov
(74) *Attorney, Agent, or Firm* — Oblon, McClelland, Maier & Neustadt, L.L.P.

(57) ABSTRACT

First content is rendered on a display screen of a computing system according to a first setting for an attribute of the first content. In response to sensing motion proximate to a sensing device, second content is displayed on the display screen according to the first setting for the attribute. The second content is displayed in a window within the first content displayed on the display screen. In response to sensing further motion, the first setting is changed to a second setting, and the second content is displayed in the window according to the second setting for the attribute. In response to sensing cessation of the further motion, the window is closed, the first content is reformatted according to the second setting for the attribute, and at least a portion of the reformatted first content on the display screen.

19 Claims, 12 Drawing Sheets

(56) References Cited

U.S. PATENT DOCUMENTS

| | | | | |
|---|---|---|---|---|
| 2012/0293427 A1* | 11/2012 | Mukai et al. | ............... | 345/173 |
| 2013/0191733 A1* | 7/2013 | Jang | ............... | G06F 17/2211 |
| | | | | 715/249 |
| 2014/0098020 A1* | 4/2014 | Koshi | ............... | G06F 3/0488 |
| | | | | 345/156 |
| 2014/0173530 A1* | 6/2014 | Mesguich Havilio | ............... | |
| | | | | G06F 3/0482 |
| | | | | 715/863 |
| 2014/0337783 A1* | 11/2014 | Allen | ............... | G06F 3/04845 |
| | | | | 715/771 |

* cited by examiner

SENSING USER INPUT TO CHANGE ATTRIBUTES OF RENDERED CONTENT

BACKGROUND

Tablet computer systems, electronic book (e-book) readers, smart phones, and other types of portable devices are increasingly popular. These types of devices have features in common, such as high resolution touchscreens that provide an easy-to-use and intuitive user interface and that allow users to interact directly with what is being displayed.

In an e-reader, for example, a page of an e-book is rendered and displayed. The electronic version of the page that is displayed looks very much like the conventional non-electronic version of the page.

One advantage that an e-book has over a conventional non-electronic book is that characteristics of the electronic page can be changed to satisfy a user's preferences. For example, if the user prefers larger-sized text, the user can change the size of the font being used.

However, changing a characteristic such as font size, while not difficult, nevertheless requires the user to perform a series of operations that may not be intuitive. First, the user opens a menu, usually by tapping the e-book's touchscreen. Next, the user selects (e.g., touches) an icon within that menu, to open a window that will allow the user to change font size. Within that window, the user opens another menu (e.g., for advanced settings) that opens up a sample window that includes text. An option for controlling font size (e.g., a slider bar) is also displayed; the user moves a slider along the bar to adjust font size, and the size of the text in the sample window changes as the user moves the slider. After deciding on a new font size, the user then needs to actively close the windows, menus, etc., that were opened in order to return and view the electronic page without obstruction. All told, multiple steps are needed in order to change font size.

As an alternative, some e-books offer a simpler approach. An option for controlling font size (e.g., a slider bar) is displayed when the user taps the touchscreen; the user moves a slider along the bar to select a new font size. After a perceivable delay, the electronic page being displayed is re-rendered using the new font size. The reason for the delay is that, in order to re-render the electronic page being displayed, other pages of the electronic book—perhaps an entire chapter—have to be re-rendered in the background for proper pagination. If the user is not satisfied with the new font size, the process is repeated, causing another delay.

SUMMARY

Accordingly, a system and/or methodology that allows a user to more expeditiously and more intuitively make changes to rendered and displayed content would be advantageous.

Embodiments according to the present invention permit the use of a simple and intuitive movement (e.g., a gesture) to control the manner in which content is rendered and displayed. Embodiments according to the invention can be used to conveniently and quickly adjust an attribute of the content such as font size; however, the invention is not so limited and can be used to adjust other attributes such as, for example, line spacing, margin setting, background color, font color, font face, alignment, brightness setting, and contrast setting.

In one embodiment, a system such as an electronic book (e-book) reader stores content and a first setting for an attribute of the content. When the content is rendered on a display screen, the displayed content ("first content") is initially formatted according to the first setting. In response to sensing motion on or near a sensing device (e.g., a touchscreen that may be part of the display screen), a window is opened within the first content and content ("second content") is displayed within the window. The motion may be, for example, a user touching, or nearly touching, the sensing device with two fingers. In that case, in one embodiment, the window is opened in a space on the display screen between the two fingers.

The second content may or may not be the same as the first content, but it is formatted according to the first setting. For example, the second content may be a copy of a portion of the first content, rendered according to the first setting in parallel with the rendering of the first content on the display screen; or the second content may be a bitmap of a portion of the first content, displayed at the same resolution as the first content; or the second content may be a sample of text retrieved from memory, where the sample text is formatted according to the first setting.

In response to sensing further motion (e.g., a continuation of the initial motion), the first setting is changed to a second setting (a first value is changed to a second value), and the second content in the window is then displayed according to the second setting. For example, the second content may be re-rendered according to the second setting; or the resolution of the second content may be changed according to the second setting; or the sample text may be reformatted according to the second setting. The further motion may be, for example, the user moving his/her two fingers closer together ("pinch close") or further apart ("stretch open").

In response to sensing cessation (e.g., a stop, pause, or interruption) of the motion, the window is closed and the first content is reformatted according to the second setting and displayed on the display screen. The cessation of the motion may be, for example, the act of the user moving his/her fingers away from the display screen.

The system can be programmed to increase and decrease font size, for example. To do this, in one embodiment, a user touches (or nearly touches) the sensing device with two fingers and, in response, a window is opened within the first content (e.g., the electronic page) currently rendered on the display device. The user can then pinch close his or her two fingers to decrease font size, or stretch open the two fingers to increase font size. In response to the pinch close or stretch open motion, the font size of the text in the window (the second content) is decreased or increased; the font size of the content displayed outside the window (the first content) remains unchanged at this point. The window thus provides the user with the opportunity to preview the new font size and determine whether or not it is satisfactory before applying it to the first content. Because only the content within the window (the second content) is reformatted, it can be accomplished relatively quickly; in other words, it is not necessary to repaginate other pages in the background in order to reformat the second content. Once the user has selected a satisfactory font size based on the preview provided in the window, he/she can then move his/her fingers away from the sensing device, in response to which the window is automatically closed and the new font size is applied to the first content rendered on the display device.

Note that a change in font size is accomplished differently from a conventional magnify/reduce operation, which merely expands or contracts the rendered content. More specifically, in embodiments according to the present invention, when the font size is increased, for example, the content is also line-wrapped and repaginated. In other words, the rendered content remains visible without horizontal scrolling.

In summary, in embodiments according to the present invention, rendered content can be readily changed (e.g., reformatted using a new font size) using intuitive user-based motions. Multiple operations are replaced with a familiar and continuous-motion operation (e.g., touch, then pinch close or stretch open, then stop touching). Also, the user does not have to actively undo preceding operations; for example, the user does not have to actively close the preview window. In addition, delays associated with conventional methods of changing the rendered content are avoided or reduced.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
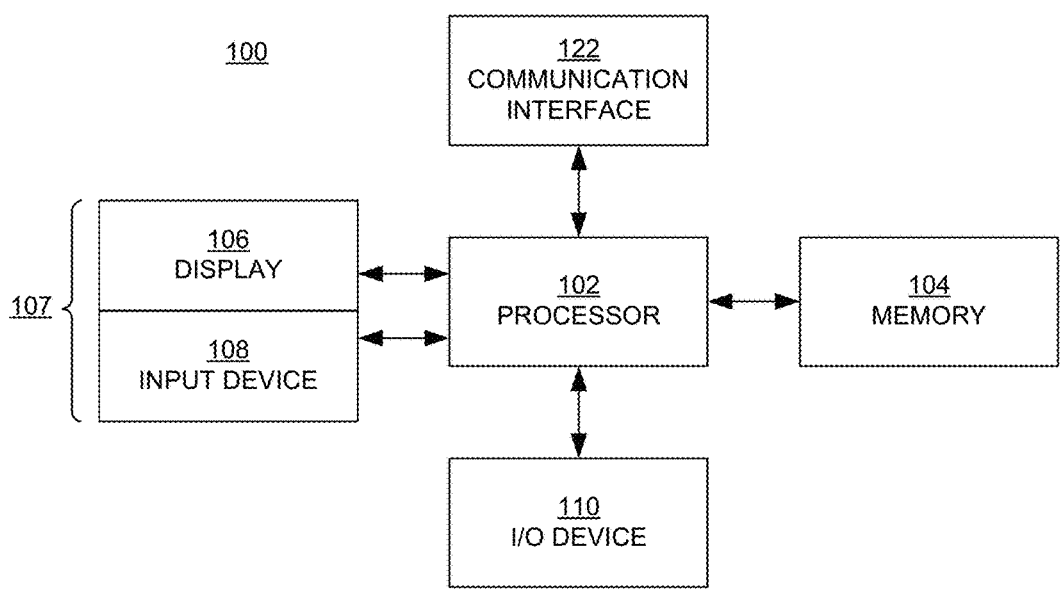
FIG. 1 is a block diagram of an example of a computing system capable of implementing embodiments according to the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "retrieving," "displaying," "rendering," "sensing," "changing," "resizing," "line-wrapping," "receiving," "formatting," "opening," "closing," or the like, refer to actions and processes (e.g., flowchart 1000 of FIG. 10) of a computer system or similar electronic computing device or processor (e.g., the computing system 100 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a computing system or computing device 100 capable of implementing embodiments according to the present invention. The computing system 100 broadly represents any single or multi-processor computing device or system capable of executing computer-readable instructions. Examples of a computing system 100 include, without limitation, an electronic book (e-book) reader, laptop, tablet, or handheld computer. The computing system 100 may also be a type of computing device such as a cell phone, smart phone, media player, camera, or the like. Depending on the implementation, the computing system 100 may not include all of the elements shown in FIG. 1, and/or it may include elements in addition to those shown in FIG. 1.

In its most basic configuration, the computing system 100 may include at least one processor 102 and at least one memory 104. The processor 102 generally represents any type or form of processing unit capable of processing data or interpreting and executing instructions. In certain embodiments, the processor 102 may receive instructions from a software application or module. These instructions may cause the processor 102 to perform the functions of one or more of the example embodiments described and/or illustrated herein.

The memory 104 generally represents any type or form of volatile or non-volatile storage device or medium capable of storing data and/or other computer-readable instructions. In certain embodiments the computing system 100 may include both a volatile memory unit (such as, for example, the memory 104) and a non-volatile storage device (not shown).

The computing system 100 also includes a display device 106 that is operatively coupled to the processor 102. The display device 106 is generally configured to display a graphical user interface (GUI) that provides an easy to use interface between a user and the computing system.

The computing system 100 also includes an input device 108 that is operatively coupled to the processor 102. The input device 108 may include a sensing device (a "touchscreen") configured to receive input from a user and to send this information to the processor 102. The term "touchscreen" is used in the widely accepted manner to include any type or form of sensing device that can sense a user input, including those types of devices that do not require a touch; that is, some touchscreens can sense a user's finger or a stylus that is near (but not touching) the surface of the touchscreen. The processor 102 interprets the sensed input in accordance with its programming. The input device 108 may be integrated with the display device 106 or they may be separate components. In the illustrated embodiment, the input device 108 is a touchscreen that is positioned over or in front of the display device 106. The input device 108 and display device 106 may be collectively referred to herein as a touchscreen display 107. There are many different technologies that can be used to sense a user's input, such as but not limited to technologies based on capacitive sensing and technologies based on resistive sensing.

The communication interface 122 of FIG. 1 broadly represents any type or form of communication device or adapter capable of facilitating communication between the example computing system 100 and one or more additional devices. For example, the communication interface 122 may facilitate communication between the computing system 100 and a private or public network including additional computing systems. Examples of a communication interface 122 include, without limitation, a wired network interface (such as a network interface card), a wireless network interface (such as a wireless network interface card), a modem, and any other suitable interface. In one embodiment, the communication interface 122 provides a direct connection to a remote server via a direct link to a network, such as the Internet. The communication interface 122 may also indirectly provide such a connection through any other suitable connection. The communication interface 122 may also represent a host adapter configured to facilitate communication between the computing system 100 and one or more additional network or storage devices via an external bus or communications channel.

As illustrated in FIG. 1, the computing system 100 may also include at least one input/output (I/O) device 110. The I/O device 110 generally represents any type or form of input device capable of providing/receiving input or output, either computer- or human-generated, to/from the computing system 100. Examples of an I/O device 110 include, without limitation, a keyboard, a pointing or cursor control device (e.g., a mouse), a speech recognition device, or any other input device.

Many other devices or subsystems may be connected to computing system 100. Conversely, all of the components and devices illustrated in FIG. 1 need not be present to practice the embodiments described herein. The devices and subsystems referenced above may also be interconnected in different ways from that shown in FIG. 1. The computing system 100 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into the computing system 100. All or a portion of the computer program stored on the computer-readable medium may then be stored in the memory 104. When executed by the processor 102, a computer program loaded into the computing system 100 may cause the processor 102 to perform and/or be a means for performing the functions of the example embodiments described and/or illustrated herein. Additionally or alternatively, the example embodiments described and/or illustrated herein may be implemented in firmware and/or hardware.

Figure 2A:
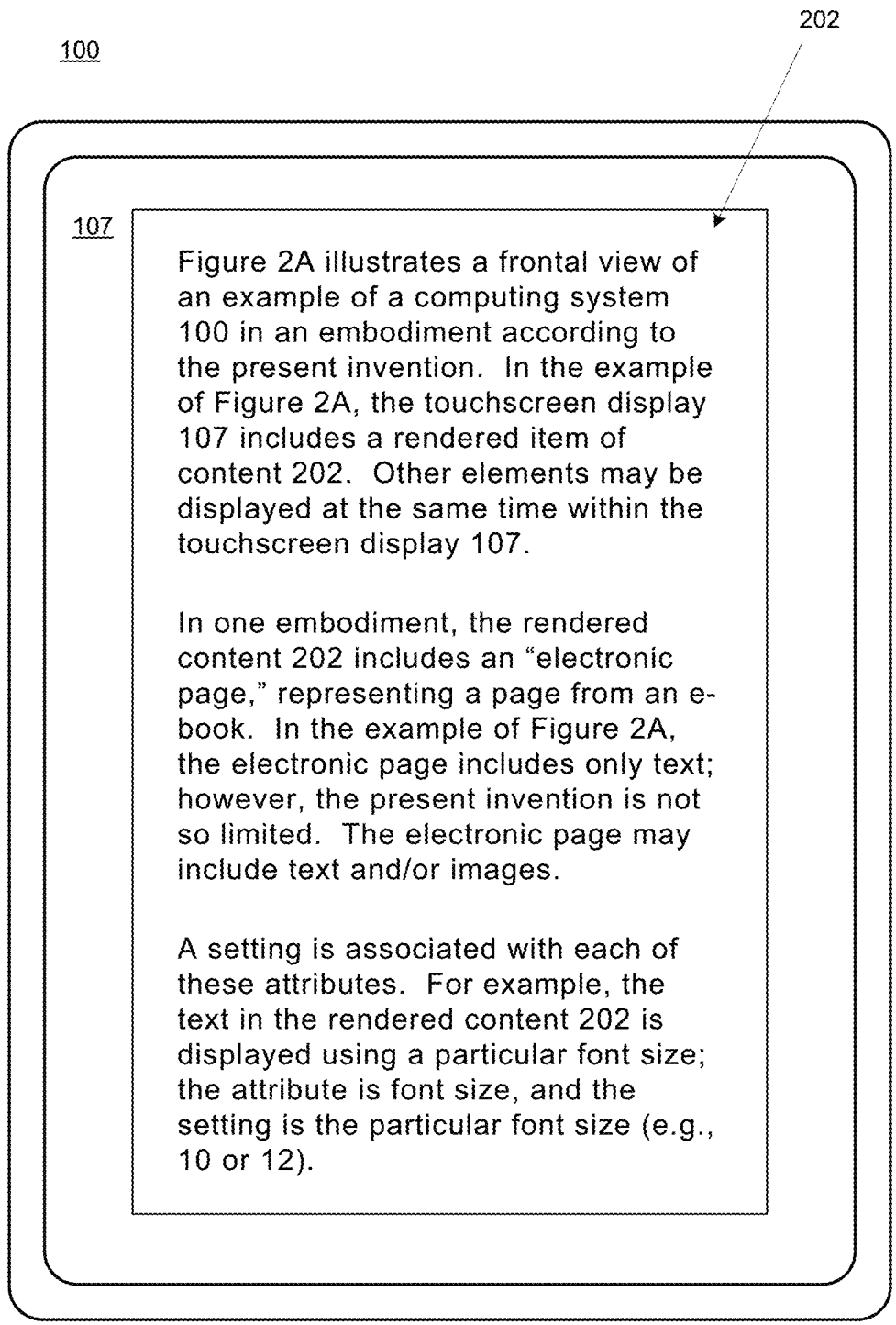
FIG. 2A illustrates a frontal view of an example of a computing system, showing a display screen, in an embodiment according to the present invention.

FIG. 2A illustrates a frontal view of an example of a computing system 100 in an embodiment according to the present invention. In the example of FIG. 2A, the touchscreen display 107 includes a rendered item of content 202. Other elements may be displayed at the same time within the touchscreen display 107.

In one embodiment, the rendered content 202 includes an electronic page, representing a page from an e-book. In the example of FIG. 2A, the electronic page includes only text. However, the present invention is not so limited; the electronic page may include text and/or images.

In general, various attributes are associated with the rendered content 202. These attributes include, but are not limited to:
  the font size of the text within the electronic page;
  the spacing between lines of the text within the electronic page;

the margins (the distances from the left, right, top, and bottom margins of the electronic page to the content within the electronic page);
the background color of the electronic page;
the font color (the color(s) of the text);
the font face (the type(s) of font used in the text, such as Arial, and also effects such as bold, underlining, and/or italics);
the brightness of the touchscreen display 107; and
the contrast of the touchscreen display.

A setting is associated with each of these attributes. For example, the text in the rendered content 202 is displayed using a particular font size, in which case the attribute is font size and the setting is the particular font size (e.g., 10, 12, etc.). The setting may be a default value or it may be a value specified by or selected by a user.

In embodiments according to the present invention, to change a setting for an attribute of the rendered content 202, the user makes a series of continuous, or nearly continuous, movements (e.g., gestures) on or near the touchscreen display 107. These movements/gestures can be made by a user with his or her fingers, in contact with or proximate to the sensing device. In general, the user's movements (gestures) are made within sensing distance of the touchscreen display 107. The computing system 100 senses these motions and, in response, can automatically change a setting, and can then also automatically reformat the rendered content displayed on the touchscreen display 107 using the new setting.

Figure 2B:
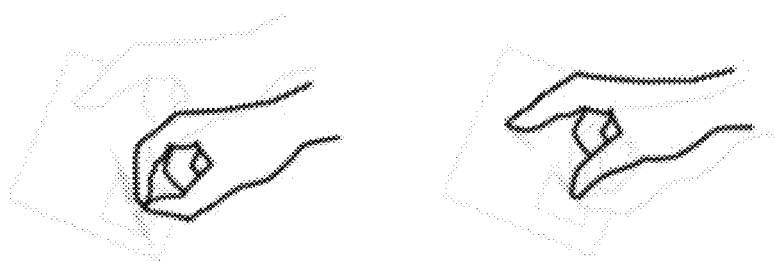
FIG. 2B illustrates examples of gestures that can be used to change an attribute of rendered content, in an embodiment according to the present invention.

The types of movements/gestures include touching (or nearly touching) the touchscreen display 107 with two fingers, pinching close the fingers (moving the two fingers closer together) while touching or nearly touching the touchscreen display, and spreading or stretching open the fingers while touching or nearly touching the touchscreen display. FIG. 2B illustrates examples of a pinch close gesture and a stretch open gesture. These movements are continuous, or nearly so, in the sense that one movement follows from another: a pinch close or stretch open gesture follows the act of placing two fingers on or near the touchscreen display 107; after a pinch close gesture is made, for example, then another pinch close gesture or a stretch open gesture can be made, and so on. The end or cessation of such movements is indicated by moving the fingers out of sensing range (e.g., the fingers are lifted off of or away from the touchscreen display 107).

Advantageously, these types of movements/gestures are intuitive and already familiar to many people. Moreover, the movements are made without having to open a toolbar or the like, and without the use of drop-down menus, slider bars, and the like. In essence, an intuitive and familiar action (e.g., pinch close or stretch open) can be used to change the setting for an attribute.

Figure 3:
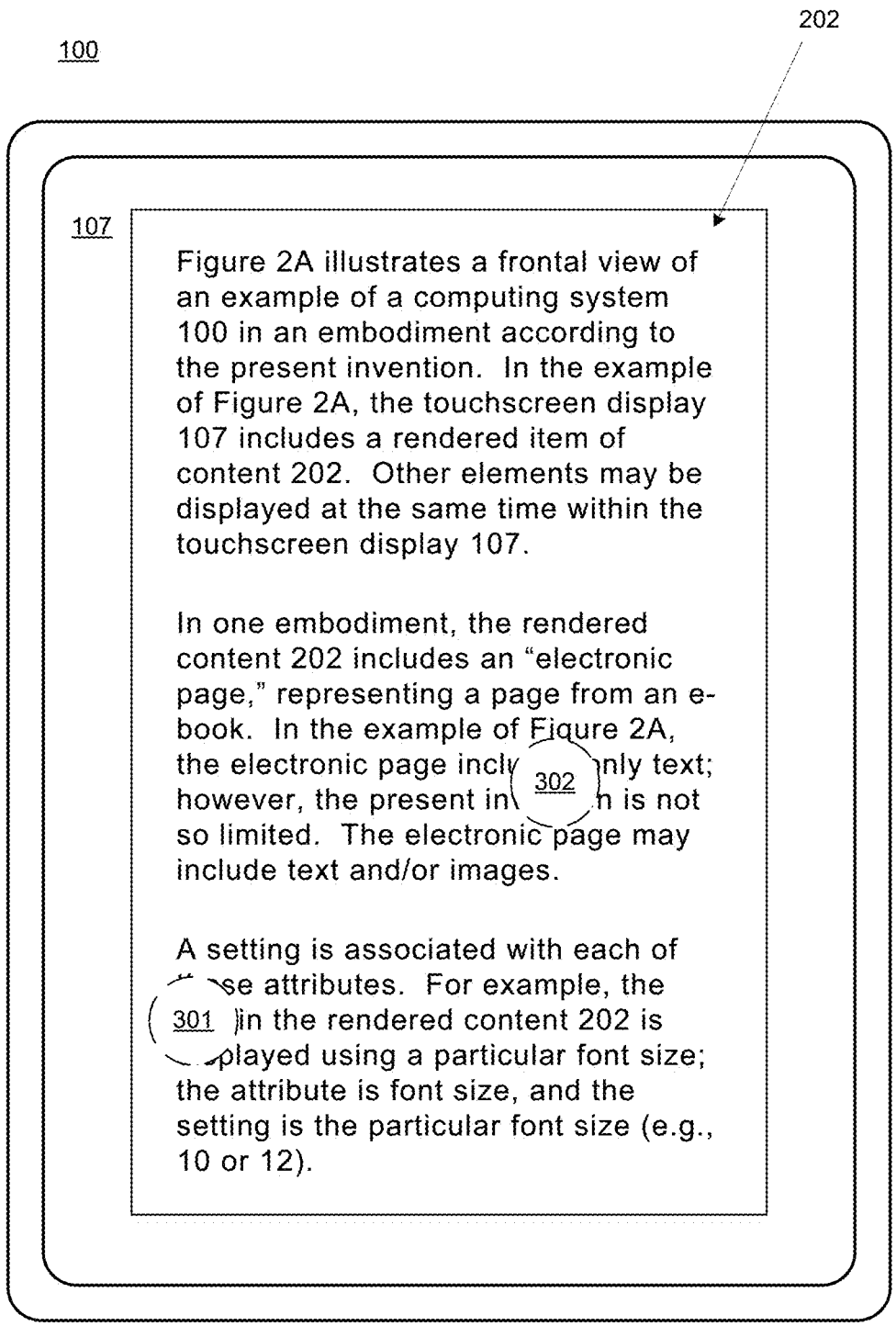
FIGS. 3, 4, 5, 6, 7, and 8 illustrate an example in which font size is changed in embodiments according to the present invention.

FIGS. 3, 4, 5, 6, 7, and 8 illustrate an example in which font size is changed in embodiments according to the present invention. With reference first to FIG. 3, a frontal view of an example of a computing system 100 is shown. In the example of FIG. 3, the touchscreen display 107 includes a rendered item of content 202 as described above. The rendered content 202 may be referred to herein as "first content."

The rendered content 202 is rendered on the touchscreen display 107 according to a first setting for an attribute of the content. In this example, the attribute is font size, and the first setting is the current value for font size (e.g., 12).

To begin the process of changing font size, a user places his or her fingers on or near (within sensing distance of) the touchscreen display 107. The fingers may be moved during the act of placing them on/near the touchscreen display 107; that is, for example, the fingers may be moved together or apart as they are placed on or near the touchscreen display. The act of placing fingers on or near the touchscreen display 107 may be referred to herein as the "first movement." In FIG. 3, the positions of the user's fingers are indicated as circular regions 301 and 302.

Figure 4:
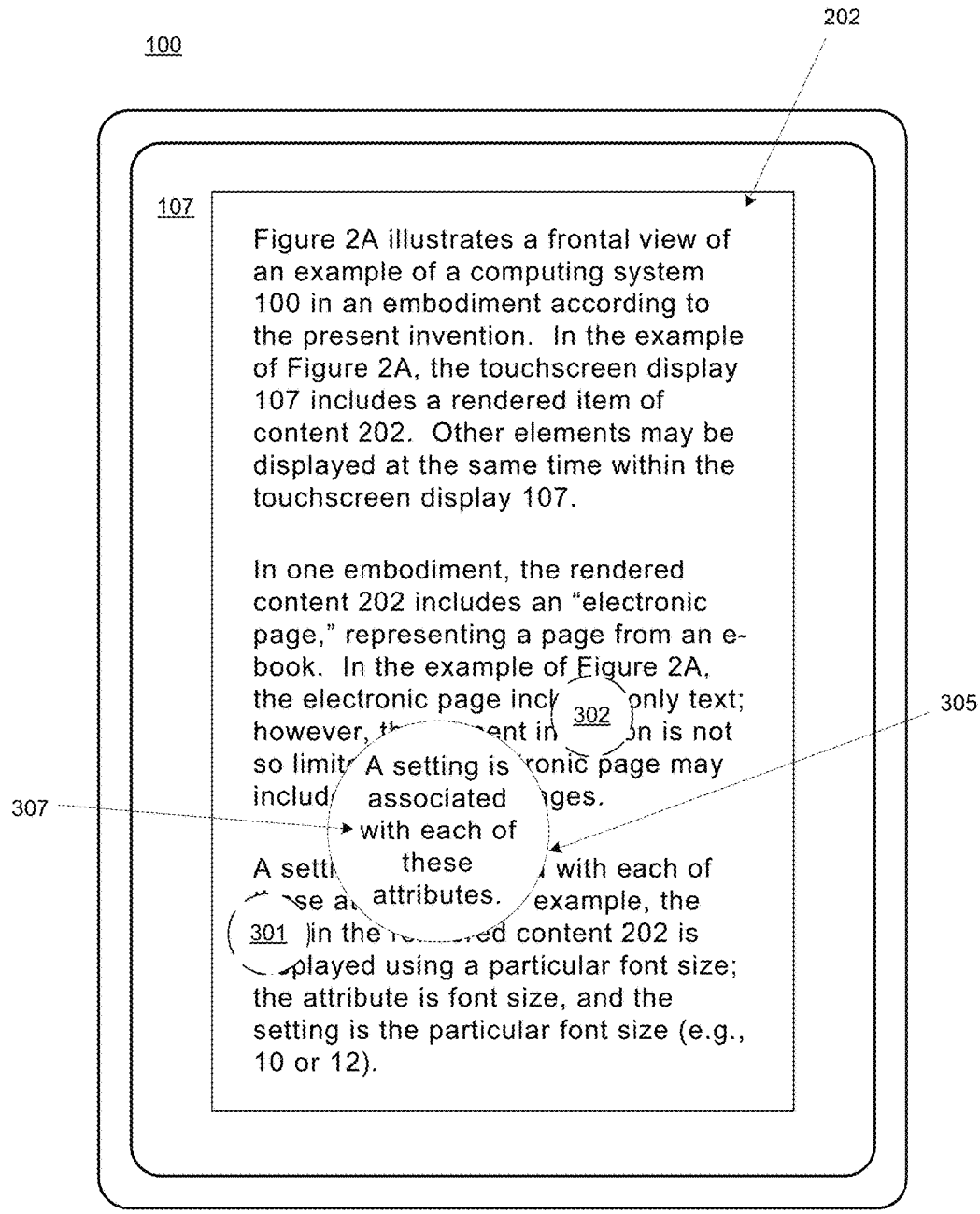

With reference next to FIG. 4, in response to sensing motion associated with the act of placing two fingers on or near the touchscreen display 107, or in response to sensing movement of either or both fingers after they are placed on or near the touchscreen display, a window 305 is opened within the rendered content 202. In one embodiment, the window 305 is circular in shape, although the present invention is not so limited. In one embodiment, the window 305 is opened in the space on the touchscreen display 107 between the two fingers (between the locations 301 and 302), although the present invention is not so limited and the window may be opened elsewhere on the touchscreen display. However, opening the window 305 in the space between the fingers is more intuitive in view of the subsequent pinch close and stretch open gestures that are about to be described, because it gives the user the sensation that he or she is working directly on the contents of the window. In one embodiment, if the user's fingers are moved to different locations relative to the touchscreen display 107, the window 305—once opened—moves with the fingers; in essence, the window remains on an imaginary line connecting the locations 301 and 302.

The window 305 includes content 307, which may be referred to herein as "second content." The second content 307 is displayed using the same, or nearly the same, first setting as that used for first the content 202. For example, if the first content 202 is rendered using a font size of 12, then the second content 307 also may use the same font size. However, the second content 307 may be displayed so that it is slightly larger or smaller (e.g., ten percent larger or smaller) than the first content 202.

The second content 307 may be based on a copy of the first content 202, rendered according to the first setting in parallel with the rendering of the first content and then masked so that only a portion of the first content appears in the window 305. In other words, data may be retrieved from a file, and that data may be processed for display and then displayed as an electronic page on the touchscreen display 107, and that data can also be processed for display and a portion of the processed data can be displayed within the window 305.

Alternatively, the second content 307 may be a bitmap of a portion of the first content 202, displayed at the same resolution as the first content.

As another alternative, the second content 307 may be a sample of stock text retrieved from memory; that is, the second content may be the same standard text regardless of what is being rendered as the first content 202. Data representing the stock text can be retrieved from memory, processed, and rendered in the window 305. Alternatively, different sizes of sample text can be pre-processed for display and stored in memory, and the appropriate sample can be retrieved and displayed depending on the size of the first content 202. For example, sample text can be pre-processed for a range of font sizes (e.g., 8, 10, 12, 14, etc.) and the results stored in memory; if the first content 202 uses font size 12, for example, then sample text at that font size can be retrieved from memory and displayed within the window 305.

Figure 5:
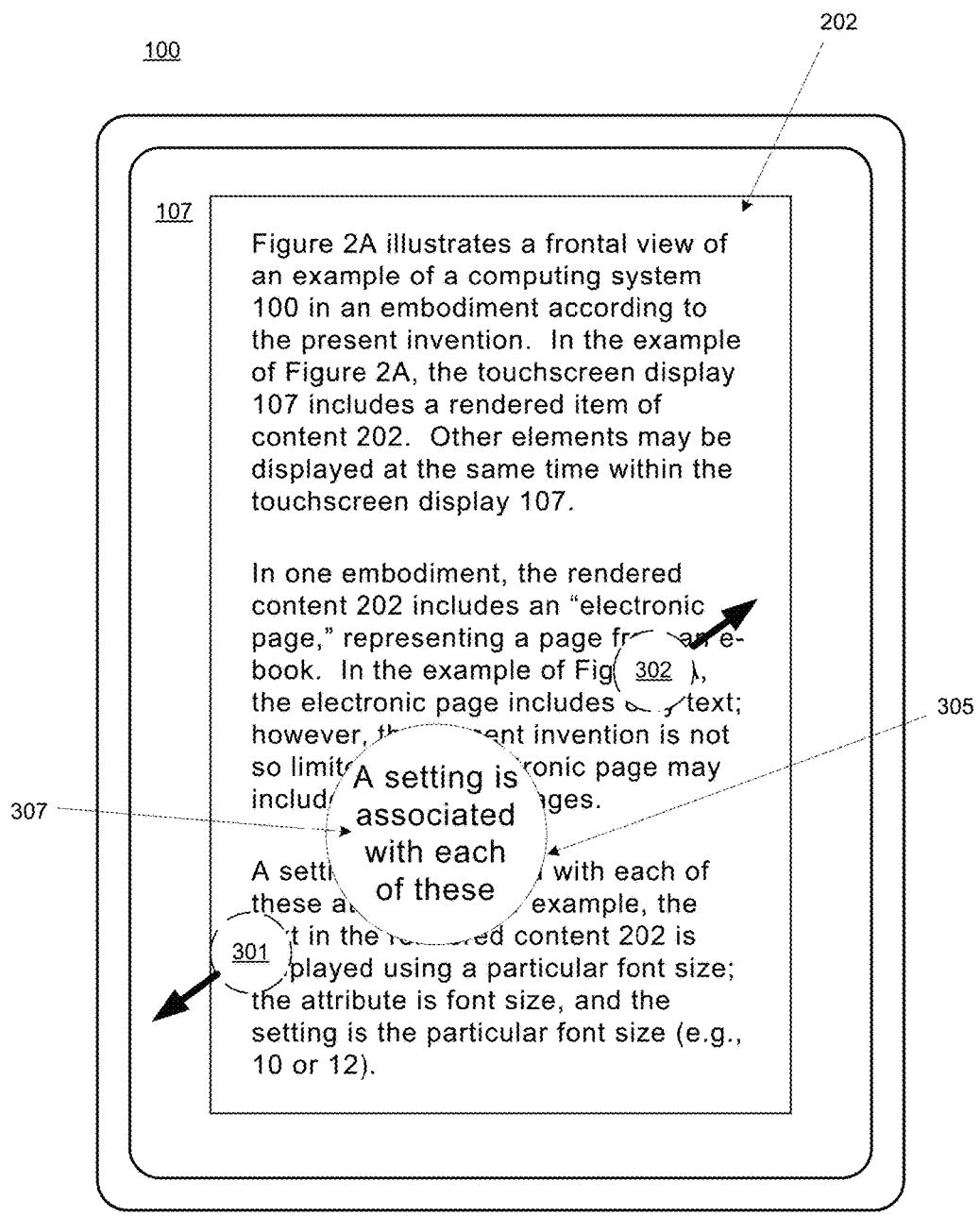

With reference to FIG. 5, the aforementioned first movement is followed by a second movement. In the example of FIG. 5, the user's fingers are stretched open. In one embodiment, the size of the window 305 does not change as the fingers are moved. However, as the user's fingers are moved further apart (relative to their initial locations 301 and 302), the size of the second content 307 increases while the size of the first content 202 remains the same.

Also, in one embodiment, the window 305 remains between the locations 301 and 302 even as those locations move further apart. In one such embodiment, the window 305 does not move as the user's fingers are stretched open; the window remains on an imaginary line between the locations 301 and 302. In another such embodiment, the window 305 moves so that it remains centered on an imaginary line between the locations 301 and 302; that is, as the user's fingers are stretched open, the window 305 moves so that it remains centered between the fingers.

In general, the first setting is changed to a second setting and the second content 307 is displayed in the window 305 using the second setting in response to sensing motion (e.g., in response to sensing the movement of the fingers after they are placed on or near the touchscreen display 107). In particular, in one embodiment, the first setting is increased (e.g., the font size is increased) and the second content 307 is displayed in the window 305 using the second setting (e.g., the new font size) when the user's fingers are stretched open. However, the first content 202 continues to be displayed using the first setting.

The reformatted (e.g., resized) second content 307 can be produced in a variety of different ways, as presented above. For example, the second content 307 may be re-rendered according to the second setting; or the resolution of the second content may be changed according to the second setting; or the stock text may be reformatted according to the second setting; or the appropriately formatted (e.g., sized) sample text can be retrieved from memory and displayed.

The window 305 thus provides the user with the opportunity to preview a new font size and determine whether or not it is satisfactory before applying it to the first content 202. Only the second content 307 within the window 305 is reformatted at this point. In order to reformat the second content 307 and generate the preview, it is not necessary to re-render the first content 202 and repaginate other pages in the background. Consequently, the preview can be generated relatively quickly, without the delay associated with conventional approaches.

Figure 6:
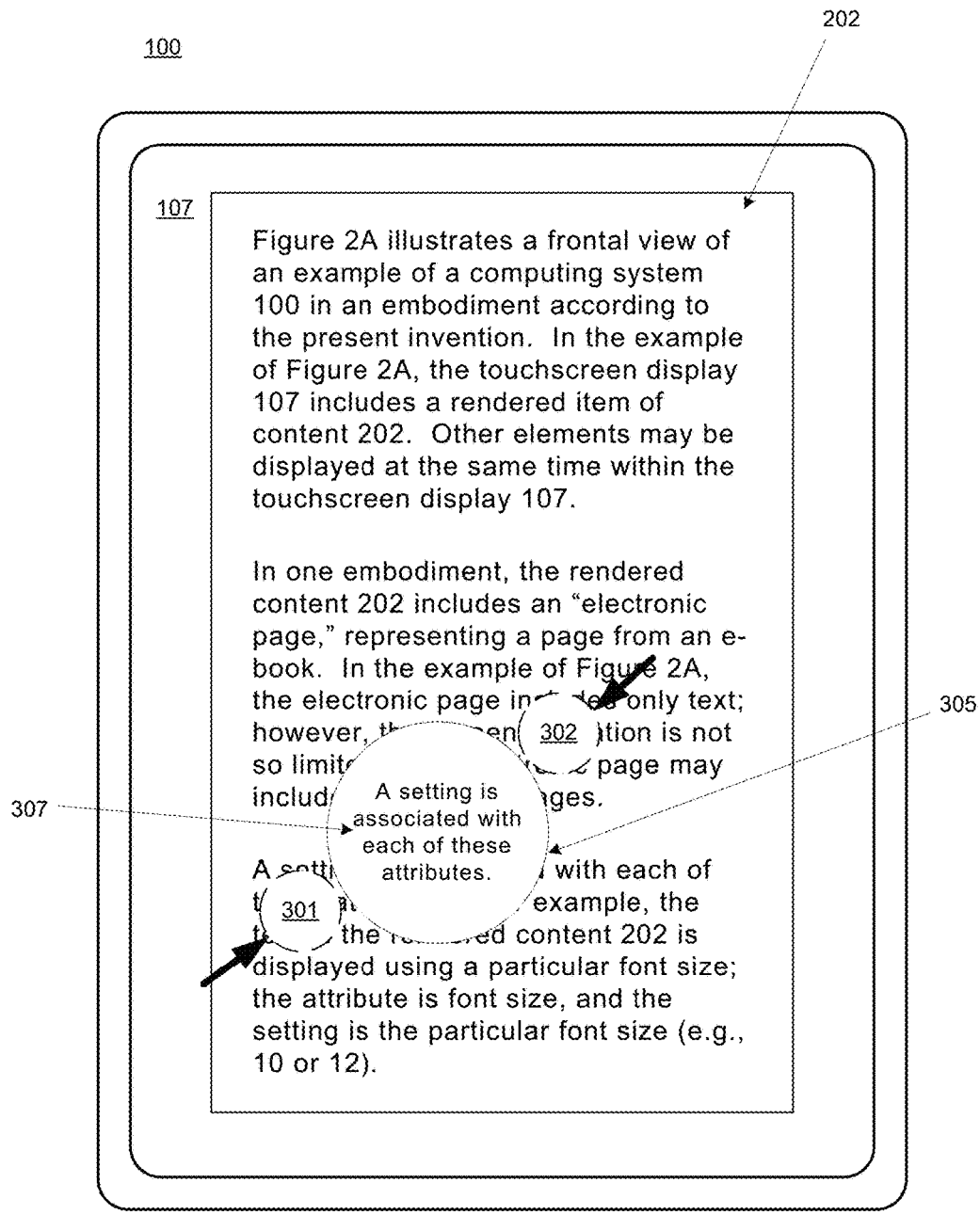

In a similar manner, with reference to FIG. 6, the second movement (following the act of placing fingers on or near the touchscreen display 107) can be a pinch close gesture instead of a stretch open gesture. In one embodiment, the size of the window 305 does not change as the fingers are moved. However, as the user's fingers are moved closer together (relative to their initial locations 301 and 302), the size of the second content 307 decreases while the size of the first content 202 remains the same. In one embodiment, the window 305 remains between the locations 301 and 302 as the fingers are pinched close and, in another embodiment, moves so that it remains centered between the locations 301 and 302 as the fingers are pinched closed. The reformatted (e.g., resized) second content 307 can be produced in a variety of different ways, as presented above. Also as presented above, the window 305 thus advantageously allows a user to quickly preview the smaller font size and determine whether or not it is satisfactory before applying it to the first content 202.

Figure 7:
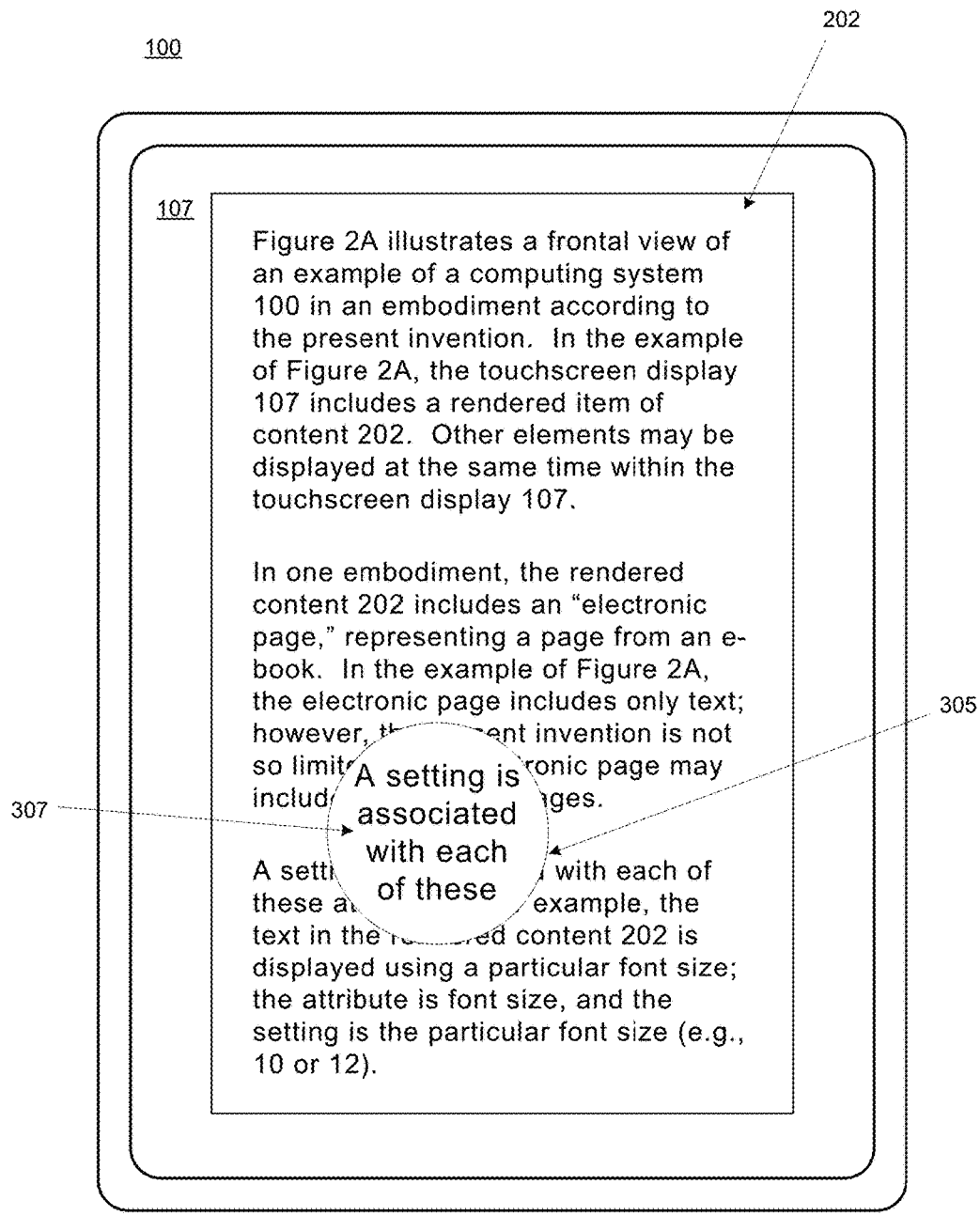

With reference now to FIG. 7, the user's fingers are moved away from the touchscreen display 107. In the example of FIG. 7, the window 305 remains open for a short period of time (e.g., on the order of a second) after the user's fingers are moved away.

Figure 8:
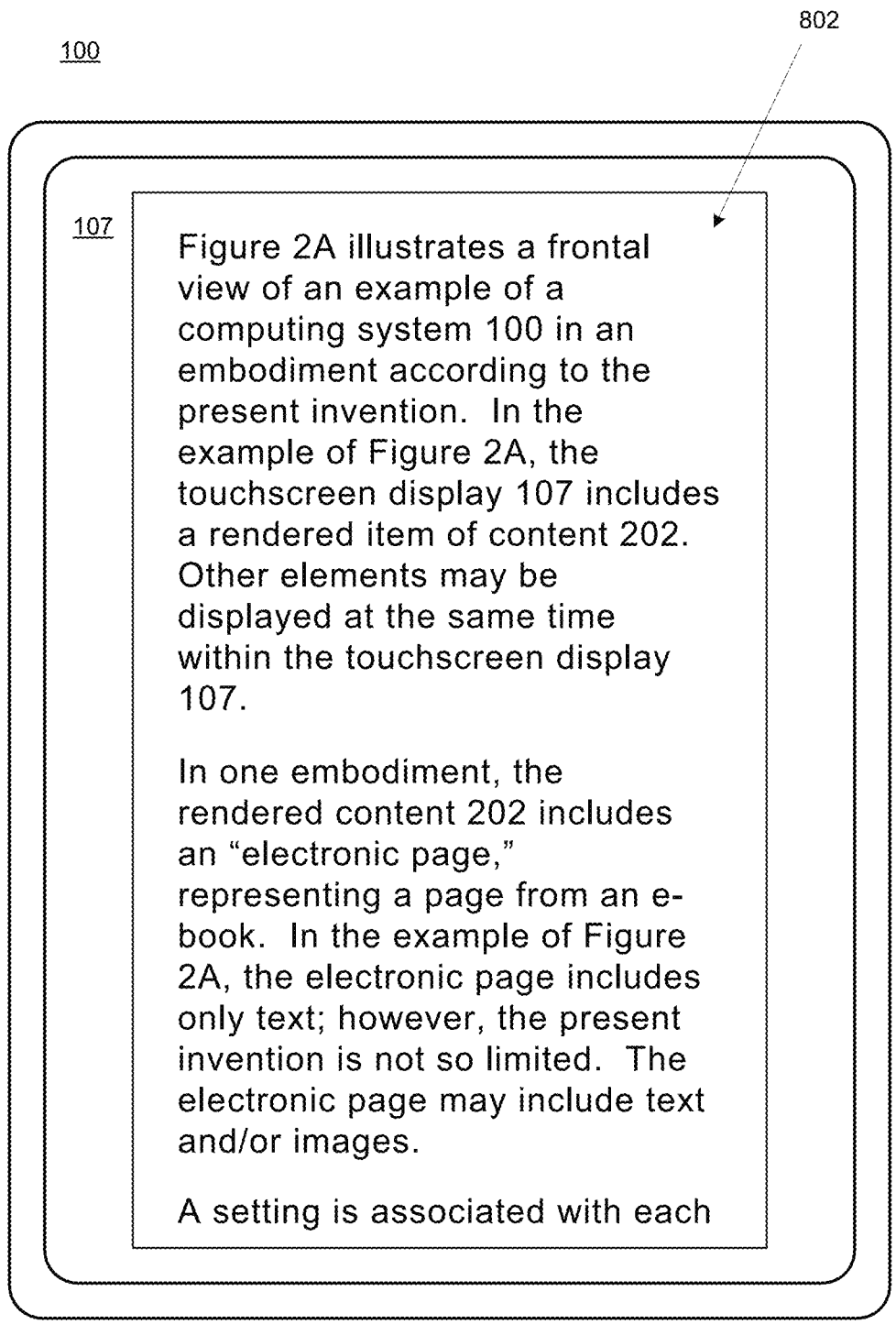

With reference to FIG. 8, in response to sensing cessation (e.g., a stop, pause, or interruption) of further (e.g., continued) movement, the window 305 is automatically closed. Thus, the user does not need to actively close the window; in general, the user does not need to actively reverse or undo previously performed operations. Cessation of further movement includes the act of moving the fingers away from the touchscreen display 107, since that act stops, interrupts, or sufficiently pauses the flow of movements following the act of placing the fingers on or near the touchscreen display.

Also, in response to sensing the cessation of further movement, the first content 202 is reformatted according to the final value of the new setting (e.g., the new font size). Note that, between the acts of placing fingers on or near the touchscreen display 107 and later moving the fingers away from the touchscreen display, the pinch close and stretch open can be repeated as many times as necessary until the user decides on a satisfactory font size. Thus, as used herein, the term "second setting" includes the final value for the setting, and also includes the case in which the second setting is equal to the first setting.

Significantly, a change in font size is accomplished differently from a conventional magnify/reduce operation, which might appear to change font size but instead merely expands or contracts the rendered content. More specifically, in embodiments according to the present invention, when the font size of the rendered content 202 (FIG. 3) is changed, the rendered content is line-wrapped and also repaginated if necessary. In the example of FIG. 8, the user has selected a larger font size relative to the initial value (FIG. 3), and the reformatted content 802 is repaginated and line-wrapped. Thus, when the font size is increased, for example, the rendered content remains visible without horizontal scrolling, allowing the text to be read from top to bottom without horizontal scrolling. In contrast, conventional magnification results in content becoming invisible in the horizontal direction (and usually in the vertical direction as well). Similarly, if the font size is reduced, then the reformatted content is repaginated and the line wrapping is adjusted, and additional text may be included so that a complete electronic page is displayed.

Note that embodiments according to the present invention, in which movements/gestures are used to change attribute settings, can be utilized in addition to a conventional magnify/reduce feature. In other words, for example, the computing system 100 can be implemented with both the capability to change font size in the rendered content as described above and the capability to magnify/reduce the rendered content. That is, changing font size as described herein is a separate feature independent of a conventional magnify/reduce feature.

Figure 9A:
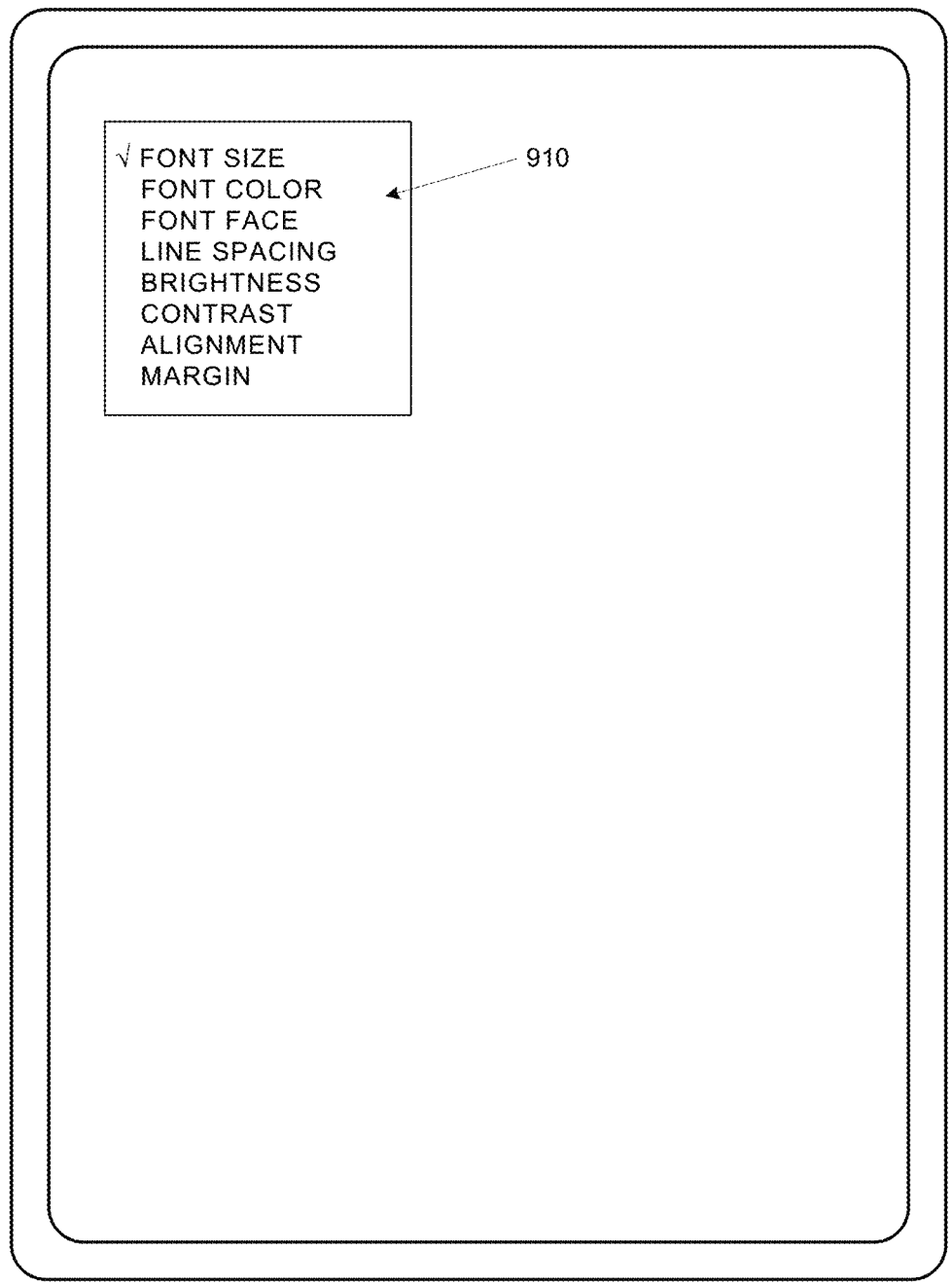
FIGS. 9A and 9B illustrate examples of graphical user interface elements that can be used to determine user preferences in an embodiment according to the present invention.

The examples of FIGS. 3-8 are discussed in the context of font size; however, the present invention is not so limited. As mentioned above, an attribute other than font size can be adjusted using the methodology just described. With reference to FIG. 9A, in one embodiment, a user can specify which attribute is to be controlled in response to a particular type of user movement. In one such embodiment, a user can access a list of attributes (e.g., the drop-down menu 910) and select an attribute from the list. In response, the system 100 (FIG. 1) is automatically programmed to change the setting for the selected attribute in response to subsequent user movements. Thus, the user can program the computing system 100 according to his or her preferences, and can change the meaning of a gesture. For example, if the computing system 100 is set up such that the stretch open gesture increases font size, the user can use the drop-down menu 910 to change the meaning of the gesture, such that it can be used instead to increase brightness, for example.

Figure 9B:
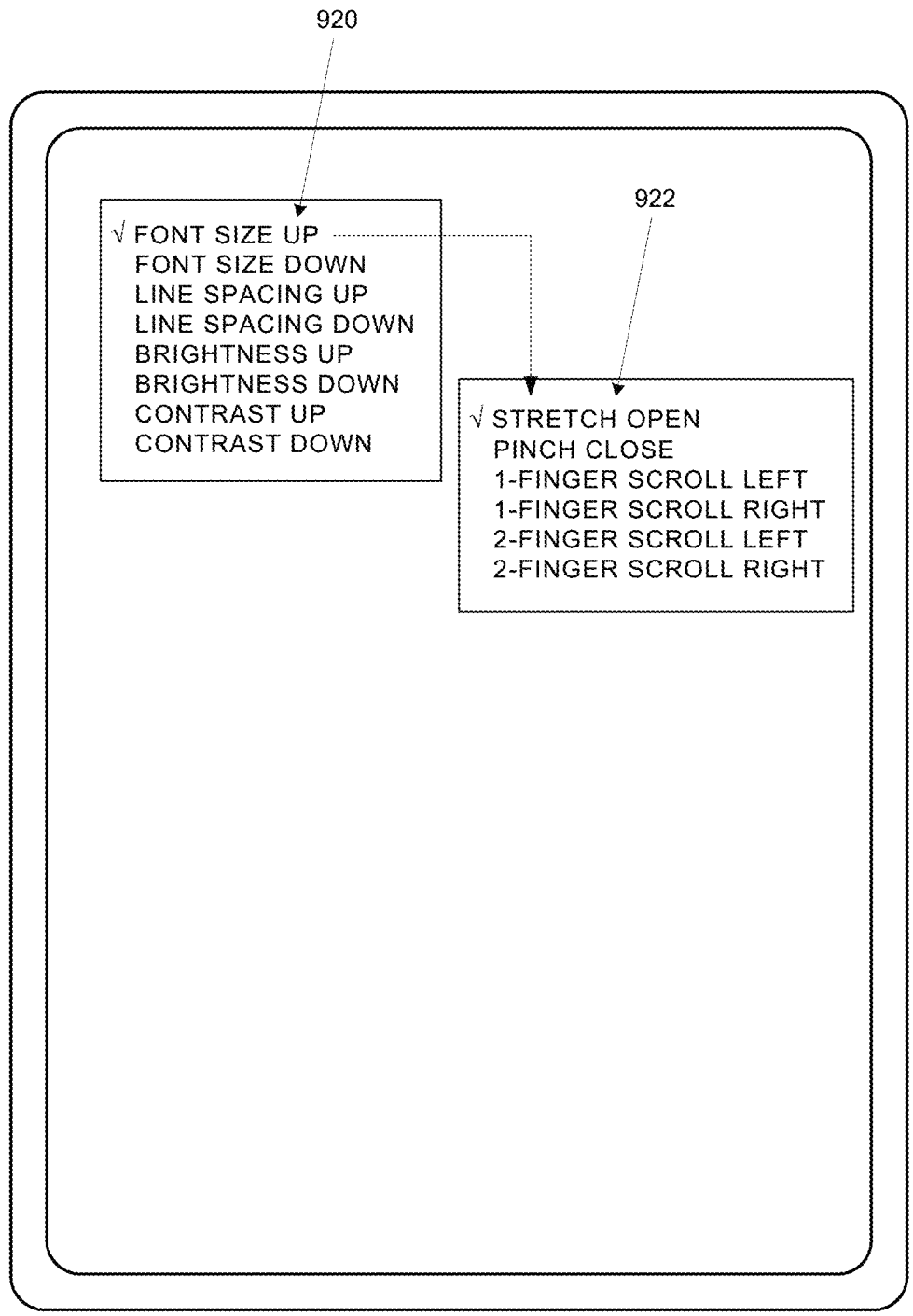

With reference to FIG. 9B, in one embodiment, a user can specify which attribute is to be controlled in response to a particular user movement. In one such embodiment, a user can access a list of attributes (e.g., the drop-down menu 920) and select an attribute from the list. For a selected attribute, the user can also access a second list of gestures (e.g., the drop-down menu 922) and select a gesture that is linked to that attribute. In response, the computing system 100 (FIG. 1) is automatically programmed to change the setting for the selected attribute in response to the selected gesture. For example, a user can program the computing system 100 so that a one-finger horizontal scroll in one direction increases brightness and a one-finger scroll in the other direction decreases brightness, and a two-finger horizontal scroll in one direction increases contrast and a two-finger scroll in the other direction decreases contrast.

Thus, in general, the use of movements/gestures to change settings can be customized according to user preferences, and different gestures can have different meanings. That is, the user can specify which setting is associated with which gesture, and one gesture can be used to change a setting for one attribute, and another gesture can be used to change a setting for a different attribute.

Figure 10:
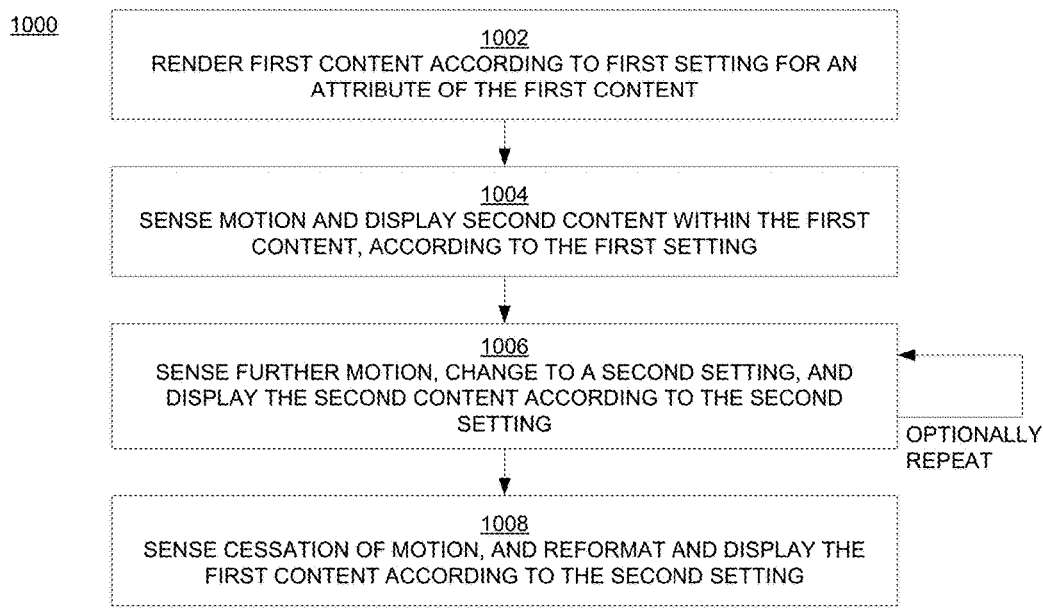
FIG. 10 is a flowchart of an example of a computer-implemented method for changing an attribute setting in an embodiment according to the present invention.

FIG. 10 is a flowchart 1000 of an example of a computer-implemented method for changing an attribute setting in an embodiment according to the present invention. The flowchart 1000 can be implemented as computer-executable instructions residing on some form of computer-readable storage medium (e.g., using the computing system 100 of FIG. 1).

In block 1002 of FIG. 10, first content is rendered on a display screen of the computing system. The first content is rendered on the display screen according to a first setting for an attribute of the first content.

In block 1004, in response to sensing motion proximate to a sensing device (e.g., a touchscreen device that may be integrated with the display screen), second content is displayed on the display screen according to the first setting for the attribute. Motion proximate to the sensing device includes motion in contact with the sensing device. The motion can include, for example, the act of placing fingers on or near the sensing device. The second content is displayed in a window within the first content displayed on the display screen.

In block 1006, in response to sensing further motion, the first setting is changed to a second setting, and the second content is displayed in the window according to the second setting for the attribute. The further motion can be, for example, a pinch close or stretch open movement. The further motion of block 1006 can be repeated one or more times.

In block 1008, in response to sensing cessation of the further motion, the window is closed, the first content is reformatted according to the second setting for the attribute, and at least a portion of the reformatted first content on the display screen. Cessation of the further motion can include the act of moving fingers away from the sensing device.

In summary, embodiments according to the present invention can allow a user to more expeditiously and more intuitively make changes to rendered and displayed content.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A non-transitory computer-readable storage medium having computer-executable instructions that, when executed, cause a computing system to perform a method comprising:

displaying, on a device comprising a touchscreen, an electronic page comprising first text having a first font size;

in response to sensing two of a user's fingers proximate to the touchscreen, opening a window within the first text and between the two fingers, and re-rendering within the window a part of the first text as a second text having a font size that is identical to the first font size of the first text on a part of the electronic page located outside of the window, wherein the second text remains at the font size that is identical to the first font size while the two fingers remain stationary, and wherein a center of the window is positioned on an imaginary line between the two fingers;

in response to sensing motion of the two fingers proximate to the touchscreen, resizing the second text within the window from the first font size to a second font size that is different from the first font size, wherein during the motion of the two fingers the window does not change in size and the center of the window remains positioned on the imaginary line between the two fingers; and in response to cessation of the motion of the two fingers, closing the window and reformatting the displayed first text, the reformatting comprising resizing the first text to the second font size and repaginating the first text according to the second font size.

2. The non-transitory computer-readable storage medium of claim 1 wherein the computing system comprises an e-book reader.

3. The non-transitory computer-readable storage medium of claim 1 wherein the motion comprises user gestures including at least one of: touching the touchscreen with the two fingers; pinching close the two fingers; and stretching open the two fingers.

4. The non-transitory computer-readable storage medium of claim 1 wherein the window remains on the imaginary line between the two fingers as the two fingers are pinched close and as the two fingers are stretched open and as the two fingers are moved to different positions relative to the touchscreen.

5. The non-transitory computer-readable storage medium of claim 1 wherein the window remains centered between the two fingers as the two fingers are pinched close and as the two fingers are stretched open.

6. The non-transitory computer-readable storage medium of claim 1 wherein resizing the second text includes re-rendering the second text using the second font size.

7. The non-transitory computer-readable storage medium of claim 1 wherein resizing the second text includes displaying the second text as a bitmap and changing a resolution of the bitmap.

8. The non-transitory computer-readable storage medium of claim 1 wherein resizing the second text includes retrieving and displaying a sample of text stored in memory, wherein the text in the sample is preformatted at the second font size.

9. A system comprising:
a processor;
a display coupled to the processor;
a touchscreen coupled to the processor; and
memory coupled to the processor, the memory have stored therein instructions that, if executed by the system, cause the system to execute operations comprising:
accessing a file stored in the memory, the file comprising data comprising first text;
displaying, on the display, an electronic page comprising the first text having a first font size;

in response to sensing two of a user's fingers proximate to the touchscreen, opening a window within the first text and between the two fingers, and re-rendering within the window a part of the first text as a second text having a font size that is identical to the first font size of the first text on a part of the electronic page located outside of the window, wherein the second text remains at the font size that is identical to the first font size while the two fingers remain stationary, and wherein a center of the window is positioned on an imaginary line between the two fingers;

in response to sensing motion of the two fingers proximate to the touchscreen, resizing the second text within the window from the first font size to a second font size that is different from the first font size, wherein during the motion of the two fingers the window does not change in size and the center of the window remains positioned on the imaginary line between the two fingers; and in response to cessation of the motion of the two fingers, closing the window and reformatting the displayed first text, the reformatting comprising resizing the first text to the second font size and repaginating the first text according to the second font size.

10. The system of claim 9 wherein the motion comprises user gestures including at least one of: touching the touchscreen with the two fingers; pinching close the two fingers; and stretching open the two fingers.

11. The system of claim 9 wherein the window remains on the imaginary line between the two fingers as the two fingers are pinched close and as the two fingers are stretched open and as the two fingers are moved to different positions relative to the touchscreen.

12. The system of claim 9 wherein the window remains centered between the two fingers as the two fingers are pinched close and as the two fingers are stretched open.

13. The system of claim 9 wherein resizing the second text includes re-rendering the second text using the second font size.

14. A method of changing attributes of displayed content, the method comprising:
displaying, on a device comprising a touchscreen, an electronic page comprising first text having a first font size;

in response to sensing two of a user's fingers proximate to the touchscreen, opening a window within the first text and between the two fingers, and re-rendering within the window a part of the first text as a second text having a font size that is identical to the first font size of the first text on a part of the electronic page located outside of the window, wherein the second text remains at the font size that is identical to the first font size while the two fingers remain stationary, and wherein a center of the window is positioned on an imaginary line between the two fingers;

in response to sensing motion of the two fingers proximate to the touchscreen, resizing the second text within the window from the first font size to a second font size that is different from the first font size, wherein during the motion of the two fingers the window does not change in size and the center of the window remains positioned on the imaginary line between the two fingers; and in response to cessation of the motion of the two fingers, closing the window and reformatting the displayed first text, the reformatting comprising resizing the first text to the second font size and repaginating the first text according to the second font size.

15. The method of claim 14 wherein the device comprises an e-book reader.

16. The method of claim 14 wherein the motion comprises user gestures including at least one of: touching the touchscreen with the two fingers; pinching close the two fingers; and stretching open the two fingers.

17. The method of claim 14 wherein resizing the second text includes at least one of: re-rendering the second text using the second font size; displaying the second text as a bitmap and changing a resolution of the bitmap; and retrieving and displaying a sample of text stored in memory, wherein the text in the sample is preformatted at the second font size.

18. The method of claim 17, wherein re-rendering the second text using the second font size includes line-wrapping and repaginating the second text.

19. The method of claim 14 wherein the window remains open for a first time period in response to sensing removal of the two fingers from the touchscreen.

\* \* \* \* \*